(12) United States Patent
Pu et al.

(10) Patent No.: US 11,157,720 B2
(45) Date of Patent: Oct. 26, 2021

(54) METHOD AND DEVICE FOR DETERMINING PATH OF HUMAN TARGET

(71) Applicant: HANGZHOU HIKVISION DIGITAL TECHNOLOGY CO., LTD., Hangzhou (CN)

(72) Inventors: Shiliang Pu, Hangzhou (CN); Lin Shen, Hangzhou (CN); Linjie Shen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/643,373

(22) PCT Filed: Aug. 22, 2018

(86) PCT No.: PCT/CN2018/101666
§ 371 (c)(1),
(2) Date: Feb. 28, 2020

(87) PCT Pub. No.: WO2019/042196
PCT Pub. Date: Mar. 7, 2019

(65) Prior Publication Data
US 2020/0257890 A1    Aug. 13, 2020

(30) Foreign Application Priority Data
Aug. 31, 2017    (CN) .......................... 201710770254.5

(51) Int. Cl.
*G06K 9/00*    (2006.01)
*G06T 7/73*    (2017.01)
*G06K 9/62*    (2006.01)

(52) U.S. Cl.
CPC ..... *G06K 9/00268* (2013.01); *G06K 9/00228* (2013.01); *G06K 9/6201* (2013.01);
(Continued)

(58) Field of Classification Search
CPC .......... G06K 9/00268; G06K 9/00228; G06K 9/6201; G06K 9/00288; G06K 9/00771;
(Continued)

(56) References Cited

U.S. PATENT DOCUMENTS

| | | |
|---|---|---|
| 2006/0062431 A1 | 3/2006 | Low |
| 2011/0317010 A1 | 12/2011 | Dhanapal et al. |
| 2015/0023596 A1 | 1/2015 | Oami et al. |

FOREIGN PATENT DOCUMENTS

| | | |
|---|---|---|
| CN | 104794458 | 7/2015 |
| CN | 104881637 | 9/2015 |

(Continued)

OTHER PUBLICATIONS

International Search Report and Written Opinion issued in corresponding PCT application No. PCT/CN2018/101666, dated Nov. 29, 2018 (English translation of International Search Report provided).

(Continued)

*Primary Examiner* — Qian Yang
(74) *Attorney, Agent, or Firm* — Norton Rose Fulbright US LLP

(57) ABSTRACT

Embodiments of the present application provide a method and apparatus for determining a trajectory of a human target. The method includes: extracting a target feature of a to-be-tracked human target in a to-be-processed image as a to-be-searched target feature; searching for an acquisition attribute corresponding to the to-be-searched target feature based on a pre-established correspondence between target features and acquisition attributes; determining a trajectory of the to-be-tracked human target based on the found acquisition attribute. It can be seen that in this solution, a face image is not required for determining a trajectory of a person. Even if the acquired face image is not clear, the accuracy of determining the trajectory of the person will not be reduced.

(Continued)

Therefore, by the solution of the present application, the accuracy of determining the trajectory of the person is improved.

16 Claims, 4 Drawing Sheets

(52) U.S. Cl.
CPC ...... *G06T 7/73* (2017.01); *G06T 2207/30196* (2013.01); *G06T 2207/30241* (2013.01)

(58) Field of Classification Search
CPC .. G06K 9/00221; G06K 9/00362; G06T 7/73; G06T 2207/30196; G06T 2207/30241
See application file for complete search history.

(56) References Cited

FOREIGN PATENT DOCUMENTS

| | | |
|---|---|---|
| CN | 105447466 | 3/2016 |
| CN | 105808709 | 7/2016 |
| CN | 106599866 | 4/2017 |
| CN | 106650652 | 5/2017 |
| CN | 106874347 | 6/2017 |
| CN | 107016374 | 8/2017 |

OTHER PUBLICATIONS

Extended European Search Report issued in Corresponding European Application No. 18852621.4, dated Jul. 1, 2020.
Office Action issued in Corresponding Chinese Application No. 201710770254.5, dated Mar. 23, 2020 (English Translation Provided).

METHOD AND DEVICE FOR DETERMINING PATH OF HUMAN TARGET

CROSS-REFERENCE TO RELATED APPLICATIONS

The present application is a national phase under 35 U.S.C. § 371 of International Application No. PCT/CN2018/101666, filed Aug. 22, 2018, which claims priority to Chinese patent application No. 201710770254.5 filed with the China National Intellectual Property Administration on Aug. 31, 2017 and entitled "Method and Apparatus for Determining Trajectory of Human Target", each of which are incorporated herein by reference in their entirety.

TECHNICAL FIELD

The present application relates to the technical field of image processing, and in particular, to a method and an apparatus for determining a trajectory of a human target.

BACKGROUND

In daily life, there are many situations in which a person's trajectory needs to be tracked. For example, when a theft, robbery and other events occur, the trajectory of a person involved in the event needs to be tracked.

At present, a person's trajectory is usually tracked with a face capture camera. Face capture cameras are set up in various places such as roads and public places. The time and place of a specific person are determined based on the face images captured by the face capture camera, thereby tracking the trajectory of the particular person.

However, with this solution, in some scenarios, for example, at night or in case the device has low definition, the captured face images are not clear, and the identity of the person cannot be accurately identified, so the person's trajectory cannot be accurately determined.

SUMMARY OF THE INVENTION

An objective of the embodiments of the present application is to provide a method and an apparatus for determining a trajectory of a human target, to improve the accuracy of determining a trajectory of a person.

In order to achieve the above objective, an embodiment of the present application provides a method for determining a trajectory of a human target, including: obtaining a to-be-processed image; extracting a target feature of a to-be-tracked human target in the to-be-processed image as a to-be-searched target feature; searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location; and determining a trajectory of the to-be-tracked human target based on the found acquisition attribute.

Optionally, after obtaining the to-be-processed image, the method may further include: extracting a facial feature of the to-be-tracked human target in the to-be-processed image, as a to-be-searched facial feature; searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

Optionally, after obtaining the to-be-processed image, the method may further include: extracting a facial feature of the to-be-tracked human target in the to-be-processed image as a to-be-searched facial feature; the step of searching for an acquisition attribute corresponding to the to-be-searched target feature based on a pre-established correspondence between target features and acquisition attributes may include: searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition feature corresponding to one pair of target feature and facial feature in the correspondence is an acquisition attribute of an image containing the target feature and the facial feature.

Optionally, the step of extracting a target feature of a to-be-tracked human target in the to-be-processed image as a to-be-searched target feature may include: extracting an original target feature of the to-be-tracked human target in the to-be-processed image, and calculating a hash value of the original target feature as a to-be-searched hash value; the step of searching for an acquisition attribute corresponding to the to-be-searched target feature based on a pre-established correspondence between target features and acquisition attributes may include: searching for an acquisition attribute corresponding to the to-be-searched hash value based on a pre-established correspondence between hash values and acquisition attributes.

Optionally, the step of searching for an acquisition attribute corresponding to the to-be-searched hash value based on a pre-established correspondence between hash values and acquisition attributes may include: calculating a similarity between each hash value included in the pre-established correspondence between hash values and acquisition attributes and the to-be-searched hash value, respectively; and determining an acquisition attribute corresponding to a hash value whose similarity with the to-be-searched hash value meets a preset condition.

Optionally, after obtaining the to-be-processed image, the method may further include: determining an acquisition attribute of the to-be-processed image as the to-be-searched acquisition attribute; the step of searching for an acquisition attribute corresponding to the to-be-searched target feature based on a pre-established correspondence between target features and acquisition attributes may include: searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature; determining whether the to-be-matched target feature matches the to-be-searched target feature; when the to-be-matched target feature matches the to-be-searched target feature, using the target acquisition attribute as the acquisition attribute corresponding to the to-be-searched target feature.

Optionally, the step of searching for an acquisition attribute corresponding to the to-be-searched target feature based on a pre-established correspondence between target features and acquisition attributes may include: searching the pre-established correspondence between target features and acquisition attributes for a target feature group matching the to-be-searched target feature; wherein the target feature group is composed of target features belonging to the same human target; and using an acquisition attribute corresponding to each target feature included in the target feature group as the acquisition attribute corresponding to the to-be-searched target feature.

Optionally, the acquisition attribute further includes acquisition time.

In order to achieve the above objective, an embodiment of the present application provides an apparatus for determining a trajectory of a human target, including: an obtaining module, configured for obtaining a to-be-processed image; a first extracting module, configured for extracting a target feature of a to-be-tracked human target in the to-be-processed image as a to-be-searched target feature; a first searching module, configured for searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location; and a first determining module, configured for determining a trajectory of the to-be-tracked human target based on the found acquisition attribute.

Optionally, the apparatus may further comprise: a second extracting module, configured for extracting a facial feature of the to-be-tracked human target in the to-be-processed image, as a to-be-searched facial feature; and a second searching module, configured for searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

Optionally, the apparatus may further include: a third extracting module, configured for extracting a facial feature of the to-be-tracked human target in the to-be-processed image as a to-be-searched facial feature; the first searching module may be further configured for: searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition feature corresponding to one pair of target feature and facial feature in the correspondence is an acquisition attribute of an image containing the target feature and the facial feature.

Optionally, the first extracting module may be further configured for: extracting an original target feature of the to-be-tracked human target in the to-be-processed image, and calculating a hash value of the original target feature as a to-be-searched hash value; the first searching module may be further configured for: searching for an acquisition attribute corresponding to the to-be-searched hash value based on a pre-established correspondence between hash values and acquisition attributes.

Optionally, the first searching module may be further configured for calculating a similarity between each hash value included in the pre-established correspondence between hash values and acquisition attributes and the to-be-searched hash value, respectively; and determining an acquisition attribute corresponding to a hash value whose similarity with the to-be-searched hash value meets a preset condition.

Optionally, the apparatus may further include: a second determining module, configured for determining an acquisition attribute of the to-be-processed image as the to-be-searched acquisition attribute; the first searching module may be further configured for: searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature; determining whether the to-be-matched target feature matches the to-be-searched target feature; when the to-be-matched target feature matches the to-be-searched target feature, using the target acquisition attribute as the acquisition attribute corresponding to the to-be-searched target feature.

Optionally, the first searching module may be further configured for: searching the pre-established correspondence between target features and acquisition attributes for a target feature group matching the to-be-searched target feature; wherein the target feature group is composed of target features belonging to the same human target; and using an acquisition attribute corresponding to each target feature included in the target feature group as the acquisition attribute corresponding to the to-be-searched target feature.

Optionally, the acquisition attribute further includes acquisition time.

In order to achieve the above objective, an embodiment of the present application provides an electronic device, comprising a processor, a communication interface, a memory, and a communication bus, wherein the processor, the communication interface, and the memory communicate with each other through the communication bus; the memory is configured to store a computer program; and the processor is configured to execute the program stored on the memory to implement any one of the methods for determining a trajectory of a human target described above.

In order to achieve the above objective, an embodiment of the present application provides a computer-readable storage medium, which stores a computer program. The computer program is executed by a processor to implement any one of the methods for determining a trajectory of a human target described above.

In order to achieve the above objective, an embodiment of the present application provides an executable program code which, when executed, implements any one of the methods for determining a trajectory of a human target described above.

In the embodiments of the present application, a target feature of the to-be-tracked human target in the image is extracted as the to-be-searched target feature; the acquisition attribute corresponding to the to-be-searched target feature is searched for based on the pre-established correspondence between target features and acquisition attributes; and the trajectory of the to-be-tracked person is determined based on the found acquisition attribute. It can be seen that in this solution, a face image is not required for determining a trajectory of a person. Even if the acquired face image is not clear, the accuracy of determining the trajectory of the person will not be reduced. Therefore, the accuracy of determining the trajectory of the person is improved by the solution.

Of course, any product or method of the present application does not necessarily achieve all the advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings described below are for only some of embodiments of the present application; those skilled in the art can also obtain other drawings based on these drawings without any creative efforts.

DETAILED DESCRIPTION OF THE INVENTION

In order to make the objective, technical solutions and advantages of the present application more clear, the present application is described below in detail with reference to the accompanying drawings and by way of example. Obviously, the described embodiments are only some, and not all, of the embodiments of the present application. All other embodiments obtained based on the embodiments of the present application by those skilled in the art without any creative efforts fall into the scope of protection defined by the present application.

In order to solve the above technical problems, embodiments of the present application provide a method and apparatus for determining a trajectory of a human target. The method and apparatus may be applied to a device having an image processing function, which is not specifically limited.

A method for determining a trajectory of a human target according to an embodiment of the present application is described first in detail below.

Figure 1:
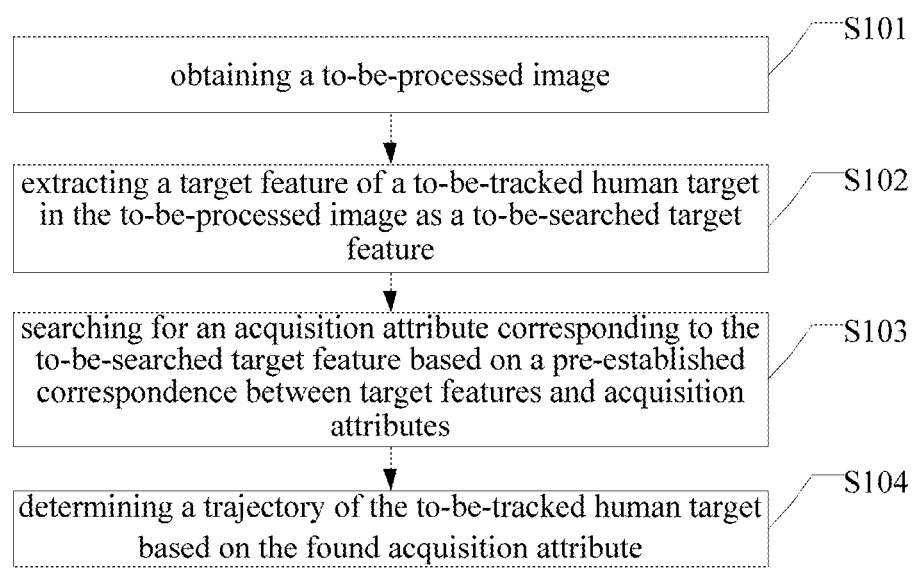
FIG. 1 is a flowchart of a method for determining a trajectory of a human target according to an embodiment of the present application.

FIG. 1 is a flowchart of a method for determining a trajectory of a human target according to an embodiment of the present application. The method includes:

S101: obtaining a to-be-processed image.

S102: extracting a target feature of a to-be-tracked human target in the to-be-processed image as a to-be-searched target feature.

S103: based on a pre-established correspondence between target features and acquisition attributes, searching for an acquisition attribute corresponding to the to-be-searched target feature; wherein an acquisition attribute corresponding to one target feature in the correspondence is an acquisition attribute of an image containing the target feature, the acquisition attribute containing an acquisition location.

S104: determining a trajectory of the to-be-tracked human target according to the found acquisition attribute.

With the embodiment shown in FIG. 1 of the present application, a target feature of the to-be-tracked human target in the image is extracted as the to-be-searched target feature; the acquisition attribute corresponding to the to-be-searched target feature is searched for based on the pre-established correspondence between the target features and the acquisition attributes, and the trajectory of the to-be-tracked person is determined according to the found acquisition attribute. It can be seen that in this solution, a face image is not required for determining the trajectory of a person. Even if the acquired face image is not clear, the accuracy of determining the trajectory of the person will not be reduced. Therefore, the accuracy of determining the trajectory of the person can be improved by this solution.

The embodiment shown in FIG. 1 is described in detail below.

S101: obtaining a to-be-processed image. The to-be-processed image is an image containing a to-be-tracked human target.

As an implementation, S101 may include: receiving a to-be-processed image input by a user; or, as another implementation, S101 may include: obtaining a to-be-processed image from a designated acquisition device.

It can be understood that when a trajectory of a human target is to be tracked, a user may input an image containing the human target; or, an acquisition device that acquires the human target may be determined and an image containing the human target may be obtained from the acquisition device.

Alternatively, the to-be-processed image may also be obtained by other methods, which are not specifically limited.

S102: extracting a target feature of a to-be-tracked human target in the to-be-processed image as a to-be-searched target feature.

The target feature of the human target may include features such as color, texture, size. The target feature may also include features of clothing worn by the human target, such as whether there is a backpack, the type of clothes, or the like. The target feature may also include features such as the height, body shape of the human target. These are not specifically limited.

There are many ways to extract a target feature in an image. For example, an area of a human target in the image is detected by using an edge detection algorithm and then the image feature of that area is extracted; or the target feature of the human target in the image is extracted by using a neural network trained and obtained in advance; or so on. These are not specifically limited.

S103: based on a pre-established correspondence between target features and acquisition attributes, searching for an acquisition attribute corresponding to the to-be-searched target feature; wherein an acquisition attribute corresponding to one target feature in the correspondence is an acquisition attribute of an image containing the target feature, the acquisition attribute containing an acquisition location.

This correspondence may be established by the following steps:

obtaining images acquired by the acquisition device and the acquisition attributes corresponding to the images;

for each of the obtained images, extracting a target feature of each human target in the image; and establishing the correspondence between the target features and the acquisition attributes.

In a first case, the acquisition attribute may only include the acquisition location; in a second case, the acquisition attribute may include the acquisition location and the acquisition time.

The first case is described by way of example. One or more acquisition devices may communicate with one server, and these acquisition devices may send the acquired images to the server in real time. The server receives the images, extracts the target features of the human targets in the images and stores the target features of the images in sequence of reception time. The server may determine the acquisition location of each received image, and establish the correspondence between the acquisition location and the target feature of the same image.

There are many ways for the server to determine the acquisition location of each received image. For example, the server obtains an acquisition location of each device in advance, and establishes the correspondence between an identifier of the device and the acquisition location. When receiving an image sent by a device, the server determines an acquisition location corresponding to an identifier of the device as an acquisition location of the image; or, an acquisition device may send an acquired image to the server together with an acquisition location thereof; or the like, which will not be enumerated one by one.

Figure 2:
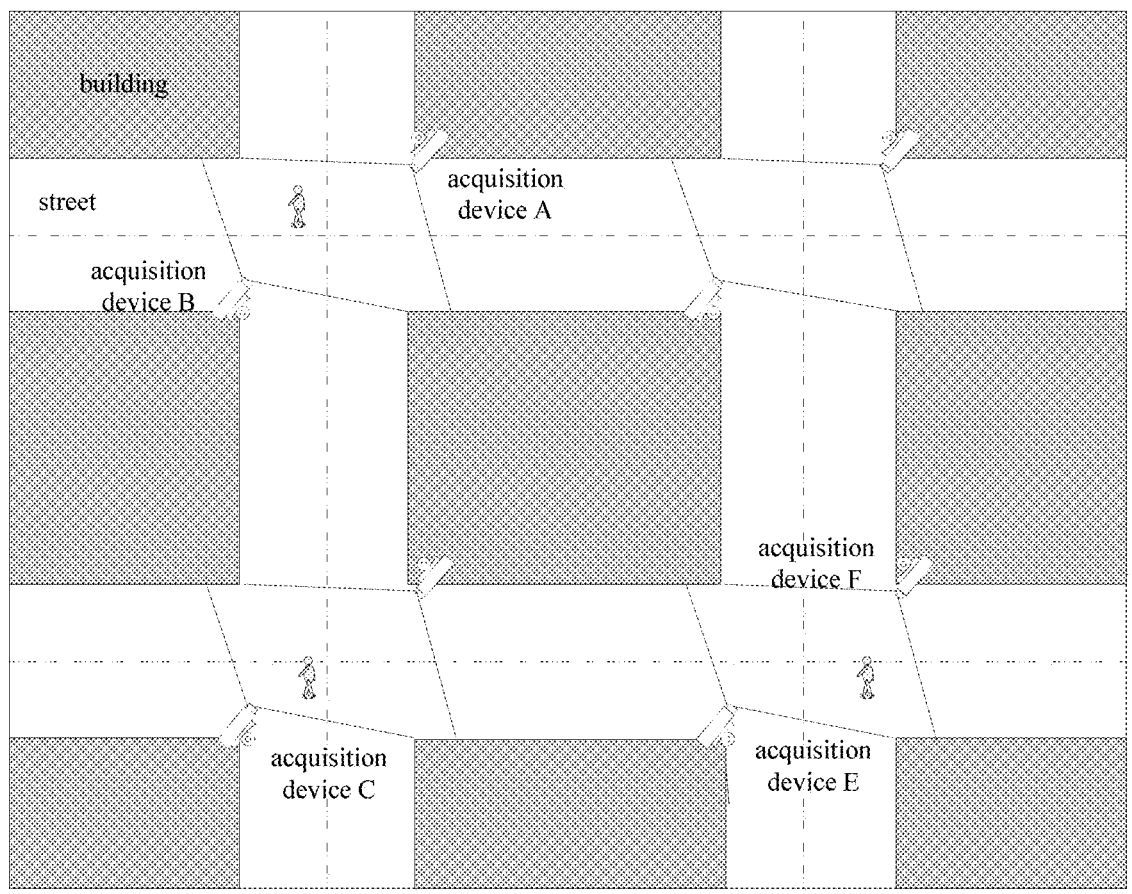
FIG. 2 is a schematic diagram of an application scenario according to an embodiment of the present application.

In the application scenario shown in FIG. 2, multiple acquisition devices are connected communicated with a same server. The server first receives an image A1 sent by an acquisition device A, extracts a target feature A2 of a human target in A1, determines an acquisition location A3 of the image A1, and establishes a correspondence between the target feature A2 and the acquisition location A3. Then, the server receives an image B1 sent by an acquisition device B, extracts a target feature B2 of a human target in B1, determines an acquisition location B3 of the image B1, and establishes a correspondence between the target feature B2 and the acquisition location B3. After that, the server also receives an image C1 sent by an acquisition device C, extracts a target feature C2 of a human target in C1, determines an acquisition location C3 of the image C1, and establishes a correspondence between the target feature C2 and the acquisition location C3. The correspondence established by the server may be shown in Table 1:

TABLE 1

| Target feature | Acquisition location |
|---|---|
| C2 | C3 |
| B2 | B3 |
| A2 | A3 |

It can be seen that, in Table 1, the correspondence is stored in order of reception time from latest to earliest. Alternatively, the correspondence may be stored in order of reception time from earliest to latest, which is not specifically limited.

The established correspondence (such as Table 1) may be stored in a local database of the server or in a database connected to the server. The execution subject of this embodiment of the present application and the server may be a same device or different devices.

Table 1 is only a simple example, and does not limit the correspondence actually established.

The second case is described by way of example. One or more acquisition devices may communicatively with a same server, and these acquisition devices may send acquired images to the server in real time or non-real time; the server receives the images, extracts target features of human targets in the images, determines acquisition time and acquisition location of each received image, and establishes the correspondence between the acquisition time, acquisition location, and target feature of a same image.

If the acquisition device sends the acquired images to the server in real time, the server may use the time when the image is received as the acquisition time; or, the acquisition device may also send the acquired images along with the acquisition time of the images to the server.

If the acquisition device sends the acquired images to the server in non-real time, the acquisition device sends the acquired images along with the acquisition time of the images to the server.

There are many ways for the server to determine the acquisition location of each received image. For example, the server obtains the acquisition location of each device in advance, and establishes the correspondence between an identifier of the device and the acquisition location. When receiving an image sent by a device, the server determines an acquisition location corresponding to an identifier of the device as an acquisition location of the image; or, the acquisition device may send an acquired image to the server together with an acquisition location thereof; or the like, which will not be enumerated one by one.

In the application scenario shown in FIG. 2, multiple acquisition devices are connected communicatively to a same server. The server receives an image A1 sent by an acquisition device A, extracts a target feature A2 of a human target in A1, determines an acquisition location A3 and acquisition time A4 of the image A1, and establishes a correspondence among the target feature A2, the acquisition location A3 and the acquisition time A4. The server receives an image B1 sent by an acquisition device B, extracts a target feature B2 of a human target in B1, determines an acquisition location B3 and acquisition time B4 of the image B1, and establishes a correspondence among the target feature B2, the acquisition location B3 and the acquisition time B4. After that, the server also receives an image C1 sent by an acquisition device C, extracts a target feature C2 of a human target in C1, determines an acquisition location C3 and acquisition time C4 of the image C1, and establishes a correspondence among the target feature C2, the acquisition location C3 and the acquisition time C4. The correspondence established by the server may be shown in Table 2:

| Target feature | Acquisition location | Acquisition time |
|---|---|---|
| C2 | C3 | C4 |
| B2 | B3 | B4 |
| A2 | A3 | A4 |

The established correspondence (such as Table 2) may be stored in a local database of the server or in a database connected to the server. The execution subject of this embodiment of the present application and the server may be a same device or different devices.

Table 2 is only a simple example, and does not limit the correspondence actually established.

S104: determining a trajectory of the to-be-tracked human target according to the found acquisition attribute.

Figure 3:
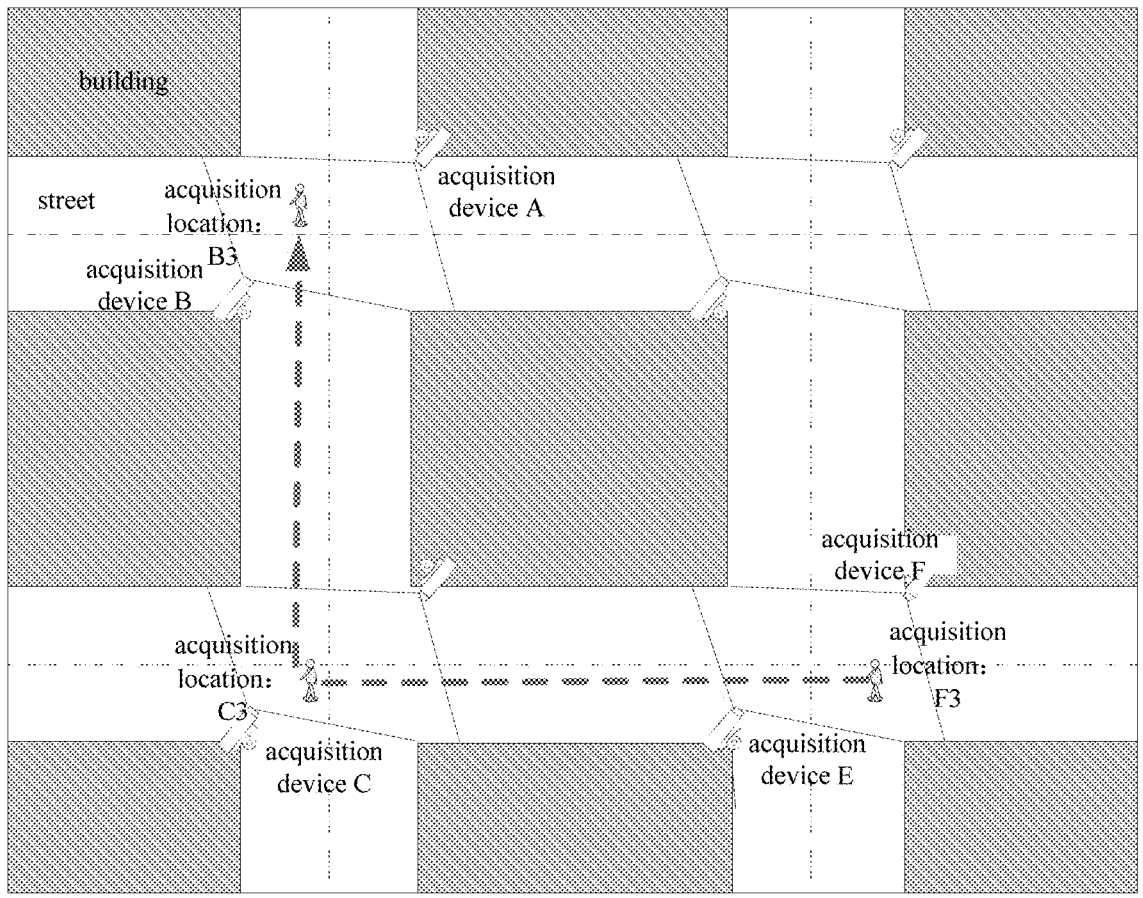
FIG. 3 is a schematic diagram of a trajectory determined in the application scenario of FIG. 2.

In the second case described above, the acquisition attribute includes the acquisition time and the acquisition location. The trajectory can be determined based on the time and location. For example, in the scenario shown in FIG. 3, three acquisition attributes of a same human target are found in the established correspondence, which include: 1. acquisition time: 9:05 am on Jul. 14, 2017, and acquisition location: B3; 2. acquisition time: 9:03 am on Jul. 14, 2017, acquisition location: C3; 3, acquisition time: 9:00 am, Jul. 14, 2017, acquisition location: F3. Therefore, the trajectory of the person can be determined as shown by the dotted line in FIG. 3, from F3 to C3 and then to B3.

In the first case described above, although the acquisition attribute does not include the acquisition time, since the correspondence is stored in order of reception time of the received images, the trajectory can also be determined based on the order and the acquisition locations. For example, in the scenario shown in FIG. 3, three acquisition attributes of a same human target are found in the established correspondence, which are sequentially: 1, acquisition location: B3; 2, acquisition location: C3; 3, acquisition location: F3. It is assumed that the storage order of the correspondence is stored in order of reception time from latest to earliest, that is, the third acquisition attribute with the earliest reception time and the first acquisition attribute with the latest reception time. Thus, it can be determined that the trajectory of the person is as shown by the dotted line in FIG. 3, from F3 to C3 and then to B3.

As an implementation, a correspondence between facial features and acquisition attributes may also be established. In this case, after S101, the method may further include: extracting a facial feature of the to-be-tracked human target in the to-be-processed image, as a to-be-searched facial feature; based on a pre-established correspondence between facial features and acquisition attributes, searching for an acquisition attribute corresponding to the to-be-searched facial feature; wherein the acquisition attribute corresponding to one facial feature in the correspondence is an acquisition attribute of an image containing the facial feature.

Specifically, establishing a correspondence between the facial features and the acquisition attributes may include:

obtaining images acquired by an acquisition device and acquisition attributes corresponding to the images;

for each of the obtained images, extracting a facial feature of each human target in the image;

establishing a correspondence between the facial features and the acquisition attributes.

The process of establishing the correspondence between facial features and acquisition attributes is similar to the process of establishing the correspondence between target features and acquisition attributes, and thus is not repeated here.

In this embodiment, the to-be-processed image includes not only the target feature of the human target, but also the facial feature of the human target. In addition to the correspondence between the target features and the acquisition attributes, the correspondence between the facial features and the acquisition attributes is also established. In this way, on the basis of the embodiment shown in FIG. 1, more acquisition attributes can be found by the facial features, and the trajectory can be determined more accurately based on more acquisition attributes.

As an implementation, a correspondence among the target features, facial features, and acquisition attributes may be established. The specific process may include:

obtaining images acquired by an acquisition device and acquisition attributes corresponding to the images;

for each of the obtained images, extracting a target feature and a facial feature of each human target in the image;

establishing a correspondence among the target features, the facial features and the acquisition attributes; wherein one pair of target feature and facial feature corresponding to the target feature in the correspondence belongs to the same human target.

The process of establishing the correspondence among the target features, facial features, and acquisition attributes is similar to the process of establishing the correspondence between the target features and the acquisition attributes, which is not repeated here.

In this case, after S101, the method may further include: extracting a facial feature of the to-be-tracked human target in the to-be-processed image as the to-be-searched facial feature;

S103 may include: based on a pre-established correspondence among the target features, the facial features and the acquisition attributes, searching for an acquisition attribute matching the to-be-searched target feature and the to-be-searched facial feature as the acquisition attribute corresponding to the to-be-searched target feature.

In order to search for the acquisition attribute that match the to-be-searched target feature and to-be-searched facial feature, a matching rule may be set. For example, the similarity between the target feature and the to-be-searched target feature in the correspondence is greater than a first preset threshold, and the similarity between the facial feature and the to-be-searched facial feature in the correspondence is greater than a second preset threshold. The first preset threshold and the second preset threshold may be set according to actual conditions, and may be same or different. The specific matching rules are not limited.

It should be noted that if the to-be-processed image contains multiple to-be-tracked human targets, a target feature and facial feature of each to-be-tracked human target may be extracted as the to-be-searched target feature and the to-be-searched facial feature. An acquisition attribute that matches the to-be-searched target feature and the to-be-searched facial feature are searched for in the established correspondence among the target features, facial features and acquisition attributes. In other words, in searching for the acquisition attribute matching with the to-be-searched target feature and the to-be-searched facial feature, it is reasonable that the to-be-searched target feature and the to-be-searched facial feature belong to a same human target.

With this embodiment, searching for the acquisition attribute that match both of the target feature and the facial feature can improve the accuracy of the search.

As an implementation, the target feature and the facial feature of the human target may be represented by a hash value. In this implementation, the target feature extracted in S102 is a hash value, and the target feature in the pre-established correspondence is also a hash value.

Specifically, S103 may include extracting an original target feature of a to-be-identified human target in the to-be-processed image, and calculating a hash value of the original target feature as a to-be-searched hash value.

Extracting a facial feature may include extracting an original facial feature of a to-be-identified human target in the to-be-processed image, and calculating a hash value of the original facial feature as a to-be-searched hash value.

S104 or searching for the acquisition attribute corresponding to the facial feature may include searching for the acquisition attribute corresponding to the to-be-searched hash value based on a pre-established correspondence between hash values and acquisition attributes.

In this embodiment, the representation of the target feature and the facial feature by hash values can improve search efficiency.

In this embodiment, searching for the acquisition attribute corresponding to the to-be-searched hash value based on the pre-established correspondence between hash values and acquisition attributes may include:

calculating similarity between each hash value included in the pre-established correspondence between hash values and acquisition attributes and the to-be-searched hash value, respectively; and determining an acquisition attribute corresponding to a hash value whose similarity with the to-be-searched hash value meets preset conditions.

There are many ways to calculate similarity. For example, Hamming distance between hash values may be used to calculate the similarity between hash values. The hash values in the correspondence may be arranged in order of similarities from high to low, and then the first preset number of hash values are selected as hash values whose similarities with the to-be-searched hash value meet the preset conditions. The acquisition attributes corresponding to the selected hash values are used as the acquisition attributes corresponding to the to-be-searched target features.

Alternatively, only a hash value having the highest similarity with the to-be-searched hash value may be used as a hash value whose similarity with the to-be-searched hash value meets the preset conditions; or, only a hash value whose similarity with the to-be-searched hash value is greater than a preset threshold may be used as a hash value whose similarity with the to-be-searched hash value meets the preset conditions; or so on. These are not specifically limited here.

As an implementation, after S101, the method may further include determining the acquisition attribute of the to-be-identified image as the to-be-searched acquisition attribute.

S103 includes: searching the pre-established correspondence between target attributes and acquisition attributes for a target acquisition attribute whose difference from the to-be-searched acquisition attribute is less than a preset threshold, and a target feature corresponding to the target acquisition attribute as the to-be-matched target feature;

determining whether the to-be-matched target feature matches the to-be-searched target feature;

if yes, using the target acquisition attribute as an acquisition attribute corresponding to the to-be-searched target feature.

In this embodiment, the acquisition attribute is first used to narrow down the search range, and then further search is performed in the search range being narrowed down.

It can be understood that in case the search method in which the similarity of the hash values is calculated is adopted, in this implementation, it is not necessary to calculate the similarities between the to-be-searched hash value and all the hash values in the correspondence, but to filter out some of the hash values based on the acquisition attribute, and then calculate only the similarities between the to-be-searched hash value and the rest of the hash values, which reduces the amount of calculation and further improves the search efficiency.

In addition, the movement trajectory of the to-be-identified human target is generally continuous, and the probability that the same human target is included in images with relatively close acquisition attributes is relatively large. Therefore, a more accurate searching result can be obtained by this implementation.

As an implementation, after the foregoing several correspondences are established, the target features or facial features stored in the correspondences may be periodically combined. It can be understood that if the similarity between multiple target features/facial features is high in the stored correspondence, the multiple target features/facial features are considered to belong to the same human target, and the multiple target features/facial features may be combined into one target feature group.

In this case, searching for the to-be-searched target feature in the correspondence is to search for a target feature group that matches the to-be-searched target feature. Specifically, S103 includes searching the pre-established correspondence between target features and acquisition attributes for a target feature group matching the to-be-searched target feature; wherein the target feature group is composed of target features belonging to the same human target; using an acquisition attribute corresponding to each target feature included in the target feature group as the acquisition attribute corresponding to the to-be-searched target feature.

Based on the pre-established correspondence between facial features and acquisition attributes, searching for the acquisition attribute corresponding to the to-be-searched facial feature includes:

searching the pre-established correspondence between facial features and acquisition attributes for a facial feature group matching the to-be-searched facial feature; wherein the facial feature group is composed of facial features belonging to the same human target; using an acquisition attribute corresponding to each facial feature included in the facial feature group as the acquisition attribute corresponding to the to-be-searched facial feature.

In the above-mentioned implementation, the correspondence between target features, facial features, and acquisition attributes is established. In this implementation, the target feature and the facial feature may be combined together, so that the target feature and the facial feature belonging to the same human target form one feature group.

Based on the pre-established correspondence between target features, facial features and acquisition attributes, searching for the acquisition attribute corresponding to the to-be-searched facial feature and the to-be-searched target feature includes:

searching the pre-established correspondence between target features, facial features and acquisition attributes for a feature group matching the to-be-searched facial feature and the to-be-searched target feature, wherein the feature group is composed of pairs of target feature and facial feature belonging to the same human target; and using an acquisition attribute corresponding to each pair of target feature and facial feature included in the feature group as the acquisition attribute corresponding to the to-be-searched facial feature.

In this implementation, in order to determine whether the to-be-searched feature matches a feature group, a matching rule may be set. For example, the similarities between the to-be-searched feature and all the features in the feature group are greater than a preset threshold, or the number of features in the feature group whose similarities with the to-be-searched feature is greater than a preset threshold is relatively large, or the like. The specific matching rule is not limited here.

In the embodiment shown in FIG. 1 of the present application, a target feature of a to-be-tracked human target in the image is extracted as a to-be-searched target feature; an acquisition attribute corresponding to the to-be-searched target feature is searched for in a pre-established correspondence between target features and acquisition attributes; and a trajectory of a to-be-tracked person is determined according to the found acquisition attribute. It can be seen that in this solution, a face image is not required for determining the trajectory of a person. Therefore, even if the acquired face image is not clear, the accuracy of determining the trajectory of the person will not be reduced. Therefore, the accuracy of determining the trajectory of the person is improved by the solution of the present application.

Corresponding to the above method embodiments, an embodiment of the present application further provides an apparatus for determining a trajectory of a human target.

Figure 4:
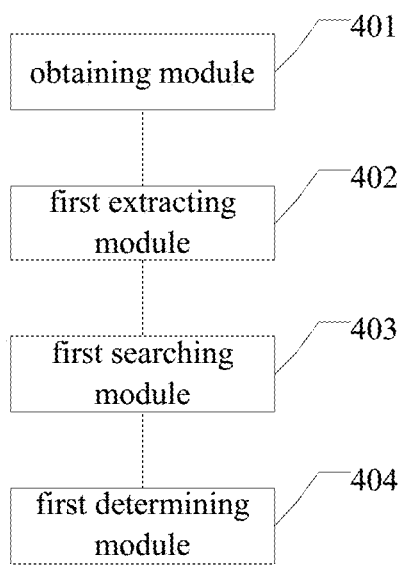
FIG. 4 is a schematic structural diagram of an apparatus for determining a trajectory of a human target according to an embodiment of the present application.

FIG. 4 is a schematic structural diagram of an apparatus for determining a trajectory of a human target according to an embodiment of the present application, including: an obtaining module 401, configured for obtaining a to-be-processed image; a first extracting module 402, configured for extracting a target feature of a to-be-tracked human target in the to-be-processed image as a to-be-searched target feature; a first searching module 403, configured for searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location; a first determining module 404, configured for determining a trajectory of the to-be-tracked human target based on the found acquisition attribute.

As an implementation, the apparatus may further include a second extracting module and a second searching module (not shown in the figures), wherein the second extracting module is configured for extracting a facial feature of the to-be-tracked human target in the to-be-processed image, as a to-be-searched facial feature; the second searching module is configured for searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

As an implementation, the apparatus may further include a third extracting module (not shown in the figures), configured for extracting a facial feature of the to-be-tracked human target in the to-be-processed image as a to-be-searched facial feature; the first searching module 403 may be further configured for searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition feature corresponding to one pair of target feature and facial feature in the correspondence is an acquisition attribute of an image containing the target feature and the facial feature.

As an implementation, the first extracting module 402 may be further configured for extracting an original target feature of the to-be-tracked human target in the to-be-processed image, and calculating a hash value of the original target feature as a to-be-searched hash value; the first searching module 403 may be further configured for searching for an acquisition attribute corresponding to the to-be-searched hash value based on a pre-established correspondence between hash values and acquisition attributes.

As an implementation, the first searching module 403 may be further configured for calculating a similarity between each hash value included in the pre-established correspondence between hash values and acquisition attributes and the to-be-searched hash value, respectively; and determining an acquisition attribute corresponding to a hash value whose similarity with the to-be-searched hash value meets a preset condition.

As an implementation, the apparatus may further include: a second determining module (not shown in the figures), configured for determining an acquisition attribute of the to-be-processed image as the to-be-searched acquisition attribute; the first searching module 403 may be further configured for searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature; determining whether the to-be-matched target feature matches the to-be-searched target feature; when the to-be-matched target feature matches the to-be-searched target feature, using the target acquisition attribute as the acquisition attribute corresponding to the to-be-searched target feature.

As an implementation, the first searching module 403 may be further configured for searching the pre-established correspondence between target features and acquisition attributes for a target feature group matching the to-be-searched target feature; wherein the target feature group is composed of target features belonging to the same human target; and using an acquisition attribute corresponding to each target feature included in the target feature group as the acquisition attribute corresponding to the to-be-searched target feature.

As an implementation, the acquisition attribute may further include acquisition time.

In the embodiment shown in FIG. 4 of the present application, a target feature of the to-be-tracked human target in the image is extracted as the to-be-searched target feature; the acquisition attribute corresponding to the to-be-searched target feature is searched for based on the pre-established correspondence between target features and acquisition attributes; and the trajectory of the to-be-tracked person is determined based on the found acquisition attribute. It can be seen that in this solution, a face image is not required for determining a trajectory of a person. Even if the acquired face image is not clear, the accuracy of determining the trajectory of the person will not be reduced. Therefore, the accuracy of determining the trajectory of the person is improved by the solution.

Figure 5:
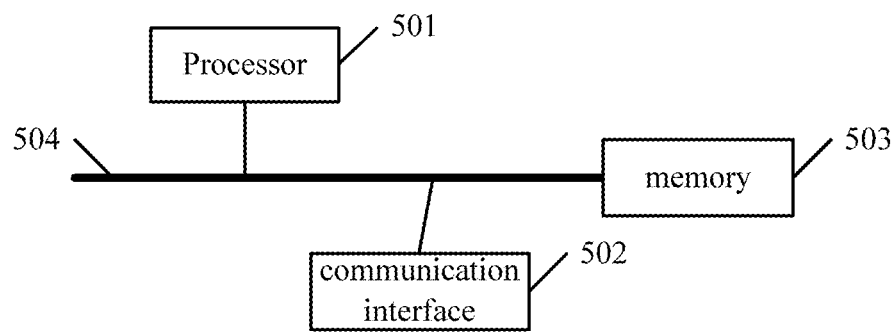
FIG. 5 is a schematic structural diagram of an electronic device according to an embodiment of the present application.

An embodiment of the present application further provides an electronic device, as shown in FIG. 5, comprising a processor 501, a communication interface 502, a memory 503, and a communication bus 504. The processor 501, the communication interface 502, and the memory 503 communicate with each other through the communication bus 504, the memory 503 is configured to store a computer program, and the processor 501 is configured to execute the program stored on the memory 503 to perform steps of: obtaining a to-be-processed image; extracting a target feature of a to-be-tracked human target in the to-be-processed image as a to-be-searched target feature; searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location; and determining a trajectory of the to-be-tracked human target based on the found acquisition attribute.

As an implementation, the processor 501 may be further configured to perform steps of: after obtaining the to-beprocessed image, extracting a facial feature of the to-be-tracked human target in the to-be-processed image, as a to-be-searched facial feature; searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

As an implementation, the processor 501 may be further configured to perform steps of: extracting a facial feature of the to-be-tracked human target in the to-be-processed image as a to-be-searched facial feature; the step of searching for an acquisition attribute corresponding to the to-be-searched target feature based on a pre-established correspondence between target features and acquisition attributes includes: searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition feature corresponding to one pair of target feature and facial feature in the correspondence is an acquisition attribute of an image containing the target feature and the facial feature.

As an implementation, the step of extracting a target feature of a to-be-tracked human target in the to-be-processed image as a to-be-searched target feature includes: extracting an original target feature of the to-be-tracked human target in the to-be-processed image, and calculating a hash value of the original target feature as a to-be-searched hash value; the step of searching for an acquisition attribute corresponding to the to-be-searched target feature based on a pre-established correspondence between target features and acquisition attributes includes: searching for an acquisition attribute corresponding to the to-be-searched hash value based on a pre-established correspondence between hash values and acquisition attributes.

As an implementation, the step of searching for an acquisition attribute corresponding to the to-be-searched hash value based on a pre-established correspondence between hash values and acquisition attributes includes: calculating a similarity between each hash value included in the pre-established correspondence between hash values and acquisition attributes and the to-be-searched hash value, respectively; and determining an acquisition attribute corresponding to a hash value whose similarity with the to-be-searched hash value meets a preset condition.

As an implementation, the processor 501 may be further configured to perform a step of: after obtaining the to-be-processed image, determining an acquisition attribute of the to-be-processed image as the to-be-searched acquisition attribute; the step of searching for an acquisition attribute corresponding to the to-be-searched target feature based on a pre-established correspondence between target features and acquisition attributes includes: searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature; determining whether the to-be-matched target feature matches the to-be-searched target feature; when the to-be-matched target feature matches the to-be-searched target feature, using the target acquisition attribute as the acquisition attribute corresponding to the to-be-searched target feature.

As an implementation, the step of searching for an acquisition attribute corresponding to the to-be-searched target feature based on a pre-established correspondence between target features and acquisition attributes includes: searching the pre-established correspondence between target features and acquisition attributes for a target feature group matching the to-be-searched target feature; wherein the target feature group is composed of target features belonging to the same human target; and using an acquisition attribute corresponding to each target feature included in the target feature group as the acquisition attribute corresponding to the to-be-searched target feature.

As an implementation, the acquisition attribute may further include acquisition time.

The communication bus mentioned in the above electronic device may be a Peripheral Component Interconnect (PCI) bus or an Extended Industry Standard Architecture (EISA) bus. The communication bus may be divided into an address bus, a data bus, a control bus, and the like. For convenience of representation, only a thick line is used in the figures to represent the communication bus, but it does not mean that there is only one bus or one type of bus.

The communication interface is used for communication between the aforementioned electronic device and other devices.

The memory may include Random Access Memory (RAM), and may also include Non-Volatile Memory (NVM), such as at least one disk memory. Optionally, the memory may also be at least one storage device located away from the foregoing processor.

The above processor may be a general-purpose processor, including a central Processing Unit (CPU), a Network Processor (NP), and the like; it may also be a Digital Signal Processor (DSP), an Application Specific Integrated Circuit (ASIC), a Field-Programmable Gate Array (FPGA) or other programmable logic devices, discrete gate or transistor logic devices, discrete hardware components.

In the embodiment shown in FIG. 5 of the present application, a target feature of the to-be-tracked human target in the image is extracted as the to-be-searched target feature; the acquisition attribute corresponding to the to-be-searched target feature is searched for based on the pre-established correspondence between target features and acquisition attributes; and the trajectory of the to-be-tracked person is determined based on the found acquisition attribute. It can be seen that in this solution, a face image is not required for determining a trajectory of a person. Even if the acquired face image is not clear, the accuracy of determining the trajectory of the person will not be reduced. Therefore, the accuracy of determining the trajectory of the person is improved by the solution.

An embodiment of the present application provides a computer-readable storage medium. The computer-readable storage medium stores a computer program, which is executed by a processor, so as to cause the processor to perform steps of: obtaining a to-be-processed image; extracting a target feature of a to-be-tracked human target in the to-be-processed image as a to-be-searched target feature; searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location; and determining a trajectory of the to-be-tracked human target based on the found acquisition attribute.

As an implementation, the computer program may be executed by a processor, so as to cause the processor to perform steps of: after obtaining the to-be-processed image, extracting a facial feature of the to-be-tracked human target in the to-be-processed image, as a to-be-searched facial feature; searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

As an implementation, the computer program may be executed by a processor, so as to cause the processor to perform a step of: extracting a facial feature of the to-be-tracked human target in the to-be-processed image as a to-be-searched facial feature; the step of searching for an acquisition attribute corresponding to the to-be-searched target feature based on a pre-established correspondence between target features and acquisition attributes includes: searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition feature corresponding to one pair of target feature and facial feature in the correspondence is an acquisition attribute of an image containing the target feature and the facial feature.

As an implementation, the step of extracting a target feature of a to-be-tracked human target in the to-be-processed image as a to-be-searched target feature includes: extracting an original target feature of the to-be-tracked human target in the to-be-processed image, and calculating a hash value of the original target feature as a to-be-searched hash value; the step of searching for an acquisition attribute corresponding to the to-be-searched target feature based on a pre-established correspondence between target features and acquisition attributes includes: searching for an acquisition attribute corresponding to the to-be-searched hash value based on a pre-established correspondence between hash values and acquisition attributes.

As an implementation, the step of searching for an acquisition attribute corresponding to the to-be-searched hash value based on a pre-established correspondence between hash values and acquisition attributes includes: calculating a similarity between each hash value includes in the pre-established correspondence between hash values and acquisition attributes and the to-be-searched hash value, respectively; and determining an acquisition attribute corresponding to a hash value whose similarity with the to-be-searched hash value meets a preset condition.

As an implementation, the computer program may be executed by a processor, so as to cause the processor to perform a step of: after obtaining the to-be-processed image, determining an acquisition attribute of the to-be-processed image as the to-be-searched acquisition attribute; the step of searching for an acquisition attribute corresponding to the to-be-searched target feature based on a pre-established correspondence between target features and acquisition attributes includes: searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature; determining whether the to-be-matched target feature matches the to-be-searched target feature; when the to-be-matched target feature matches the to-be-searched target feature, using the target acquisition attribute as the acquisition attribute corresponding to the to-be-searched target feature.

As an implementation, the step of searching for an acquisition attribute corresponding to the to-be-searched target feature based on a pre-established correspondence between target features and acquisition attributes includes: searching the pre-established correspondence between target features and acquisition attributes for a target feature group matching the to-be-searched target feature; wherein the target feature group is composed of target features belonging to the same human target; and using an acquisition attribute corresponding to each target feature included in the target feature group as the acquisition attribute corresponding to the to-be-searched target feature.

As an implementation, the acquisition attribute may further include acquisition time.

An embodiment of the present application further discloses an executable program code, wherein the executable program code is executed to implement any one of the methods for determining a trajectory of a human target described above.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements defined by the wording "include(s) a/an . . . " or "comprise(s) a/an . . . " do not exclude additional identical elements in the processes, methods, articles, or devices that includes the listed elements.

All of the embodiments in the description are described in a correlated manner, and identical or similar parts in various embodiments can refer to one another. In addition, the description for each embodiment focuses on the differences from other embodiments. In particular, the embodiments of the apparatus shown in FIG. 4, the electronic device shown in FIG. 5 and the above storage medium are described briefly, since they are substantially similar to the embodiment of the method shown in FIGS. 1-3, and the related contents can refer to the description of the embodiment of the method shown in FIGS. 1-3.

The above embodiments are simply preferable embodiments of the present application, and are not intended to limit the scope of protection of the present application. Any modifications, equivalent alternatives, improvements, or the like within the spirit and principle of the present application shall be included within the scope of protection of the present application.

The invention claimed is:

1. A method for determining a trajectory of a human target, comprising:
    obtaining a to-be-processed image;
    extracting a target feature of a to-be-tracked human target in the to-be-processed image as a to-be-searched target feature;
    searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location or an acquisition location and acquisition time; and determining a trajectory of the to-be-tracked human target based on the found acquisition attribute, wherein when the acquisition attribute contains the acquisition location, the correspondence is pre-established by a server performing operations of: receiving captured images sent in real time by acquisition devices; extracting target features of human targets in the received images; storing the target features of the images in sequence of reception time; determining the acquisition location of each of the received images and establishing the correspondence between the acquisition location and the target feature of the same image; or wherein when the acquisition attribute contains the acquisition location and acquisition time, the correspondence is pre-established by the server performing operations of: receiving captured images sent in real time by the acquisition devices; extracting target features of human targets in the received images; determining acquisition time and acquisition location of each of the received images; and establishing the correspondence between the acquisition location, the acquisition location and the target feature of the same image.

2. The method according to claim 1, wherein after obtaining the to-be-processed image, the method further comprises:

extracting a facial feature of the to-be-tracked human target in the to-be-processed image, as a to-be-searched facial feature;

searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

3. The method according to claim 1, wherein after obtaining the to-be-processed image, the method further comprises:

extracting a facial feature of the to-be-tracked human target in the to-be-processed image as a to-be-searched facial feature;

the step of searching for an acquisition attribute corresponding to the to-be-searched target feature based on a pre-established correspondence between target features and acquisition attributes comprises:

searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition attribute corresponding to one pair of target feature and facial feature in the correspondence is an acquisition attribute of an image containing the target feature and the facial feature.

4. The method according to claim 1, wherein the step of extracting a target feature of a to-be-tracked human target in the to-be-processed image as a to-be-searched target feature comprises:

extracting an original target feature of the to-be-tracked human target in the to-be-processed image, and calculating a hash value of the original target feature as a to-be-searched hash value;

the step of searching for an acquisition attribute corresponding to the to-be-searched target feature based on a pre-established correspondence between target features and acquisition attributes comprises:

searching for an acquisition attribute corresponding to the to-be-searched hash value based on a pre-established correspondence between hash values and acquisition attributes.

5. The method according to claim 4, wherein the step of searching for an acquisition attribute corresponding to the to-be-searched hash value based on a pre-established correspondence between hash values and acquisition attributes comprises:

calculating a similarity between each hash value comprised in the pre-established correspondence between hash values and acquisition attributes and the to-be-searched hash value, respectively; and determining an acquisition attribute corresponding to a hash value whose similarity with the to-be-searched hash value meets a preset condition.

6. The method according to claim 1, wherein after obtaining the to-be-processed image, the method further comprises:

determining an acquisition attribute of the to-be-processed image as the to-be-searched acquisition attribute;

the step of searching for an acquisition attribute corresponding to the to-be-searched target feature based on a pre-established correspondence between target features and acquisition attributes comprises:

searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature;

determining whether the to-be-matched target feature matches the to-be-searched target feature;

when the to-be-matched target feature matches the to-be-searched target feature, using the target acquisition attribute as the acquisition attribute corresponding to the to-be-searched target feature.

7. The method according to claim 1, wherein the step of searching for an acquisition attribute corresponding to the to-be-searched target feature based on a pre-established correspondence between target features and acquisition attributes comprises:

searching the pre-established correspondence between target features and acquisition attributes for a target feature group matching the to-be-searched target feature; wherein the target feature group is composed of target features belonging to the same human target; and using an acquisition attribute corresponding to each target feature comprised in the target feature group as the acquisition attribute corresponding to the to-be-searched target feature.

8. The method according to claim 1, wherein, the acquisition attribute further comprises acquisition time.

9. An electronic device, comprising a processor and a memory wherein,
the memory is configured to store a computer program,
the processor is configured to execute the program stored on the memory to perform steps of:
obtaining a to-be-processed image;
extracting a target feature of a to-be-tracked human target in the to-be-processed image as a to-be-searched target feature;
searching for an acquisition attribute corresponding to the to-be-searched target feature based on a pre-established correspondence between target features and acquisition attributes; wherein an acquisition attribute corresponding to one target feature in the correspondence is an acquisition attribute of an image containing the target feature, and the acquisition attribute contains an acquisition location or an acquisition location and acquisition time; and
determining a trajectory of the to-be-tracked human target based on the found acquisition attribute,
wherein when the acquisition attribute contains the acquisition location, the correspondence is pre-established by a server performing operations of: receiving captured images sent in real time by acquisition devices; extracting target features of human targets in the received images; storing the target features of the images in sequence of reception time; determining the acquisition location of each of the received images and establishing the correspondence between the acquisition location and the target feature of the same image; or
wherein when the acquisition attribute contains the acquisition location and acquisition time, the correspondence is pre-established by the server performing operations of: receiving captured images sent in real time by the acquisition devices; extracting target features of human targets in the received images; determining acquisition time and acquisition location of each of the received images; and establishing the correspondence between the acquisition location, the acquisition location and the target feature of the same image.

10. The device according to claim 9, wherein, the processor is further configured to perform steps of:
after obtaining the to-be-processed image, extracting a facial feature of the to-be-tracked human target in the to-be-processed image, as a to-be-searched facial feature;
searching for an acquisition attribute corresponding to the to-be-searched facial feature based on a pre-established correspondence between facial features and acquisition attributes; wherein an acquisition attribute corresponding to one facial feature in the correspondence is an acquisition attribute of an image containing the facial feature.

11. The device according to claim 9, wherein, the processor is further configured to perform a step of: extracting a facial feature of the to-be-tracked human target in the to-be-processed image as a to-be-searched facial feature;
the step of searching for an acquisition attribute corresponding to the to-be-searched target feature based on a pre-established correspondence between target features and acquisition attributes comprises:
searching for an acquisition attribute matching the to-be-searched target feature and the to-be-searched facial feature as the acquisition attribute corresponding to the to-be-searched target feature based on a pre-established correspondence among target features, facial features and acquisition attributes; wherein one pair of target feature and facial feature in the correspondence belongs to the same human target, and an acquisition attribute corresponding to one pair of target feature and facial feature in the correspondence is an acquisition attribute of an image containing the target feature and the facial feature.

12. The device according to claim 9, wherein, the step of extracting a target feature of a to-be-tracked human target in the to-be-processed image as a to-be-searched target feature comprises:
extracting an original target feature of the to-be-tracked human target in the to-be-processed image, and calculating a hash value of the original target feature as a to-be-searched hash value;
the step of searching for an acquisition attribute corresponding to the to-be-searched target feature based on a pre-established correspondence between target features and acquisition attributes comprises:
searching for an acquisition attribute corresponding to the to-be-searched hash value based on a pre-established correspondence between hash values and acquisition attributes.

13. The device according to claim 12, wherein, the step of searching for an acquisition attribute corresponding to the to-be-searched hash value based on a pre-established correspondence between hash values and acquisition attributes comprises:
calculating a similarity between each hash value comprised in the pre-established correspondence between hash values and acquisition attributes and the to-be-searched hash value, respectively; and
determining an acquisition attribute corresponding to a hash value whose similarity with the to-be-searched hash value meets a preset condition.

14. The device according to claim 9, wherein, the processor is further configured to perform a step of: after obtaining the to-be-processed image, determining an acquisition attribute of the to-be-processed image as the to-be-searched acquisition attribute;
the step of searching for an acquisition attribute corresponding to the to-be-searched target feature based on a pre-established correspondence between target features and acquisition attributes comprises:
searching the pre-established correspondence between target attributes and acquisition attributes for a target acquisition attribute whose difference from the to-be-searched acquisition attribute is less than a preset threshold, and a target feature corresponding to the target acquisition attribute as a to-be-matched target feature;
determining whether the to-be-matched target feature matches the to-be-searched target feature;
when the to-be-matched target feature matches the to-be-searched target feature, using the target acquisition attribute as the acquisition attribute corresponding to the to-be-searched target feature.

15. The device according to claim 9, wherein, the step of searching for an acquisition attribute corresponding to the to-be-searched target feature based on a pre-established correspondence between target features and acquisition attributes comprises:
searching the pre-established correspondence between target features and acquisition attributes for a target feature group matching the to-be-searched target feature; wherein the target feature group is composed of target features belonging to the same human target; and using an acquisition attribute corresponding to each target feature comprised in the target feature group as the acquisition attribute corresponding to the to-be-searched target feature.

16. The device according to claim 9, wherein, the acquisition attribute further comprises acquisition time.

* * * * *